United States Patent [19]

Mixan

[11] 3,869,466
[45] Mar. 4, 1975

[54] 4-CYANO-3,5-ISOTHIAZOLEDIYLBIS(THIOMETHYLENE)DITHIOCYANATE

[75] Inventor: Craig E. Mixan, Midland, Mich.

[73] Assignee: The Dow Chemical Company, Midland, Mich.

[22] Filed: July 30, 1973

[21] Appl. No.: 384,156

[52] U.S. Cl............................. 260/302 S, 424/270
[51] Int. Cl.......................................... C07d 91/12
[58] Field of Search............................... 260/302 S

[56] References Cited
UNITED STATES PATENTS

| | | | |
|---|---|---|---|
| 3,230,229 | 1/1966 | Hatchard | 260/302 S |
| 3,634,443 | 1/1972 | Schmidt et al. | 260/302 S |
| 3,781,285 | 12/1973 | D'Amico | 200/302 S |

Primary Examiner—Richard J. Gallagher
Attorney, Agent, or Firm—Theodore Post; C. Kenneth Bjork

[57] ABSTRACT

4-Cyano-3,5-isothiazolediylbis(thiomethylene)dithiocyanate is prepared by reacting substantially one molar proportion of disodium 3,5-dimercapto-4-isothiazolecarbonitrile with substantially 2 molar proportions of chloromethythiocyanate at room temperature until by-product sodium chloride no longer forms and recovering the product from the reaction medium. The compound has antimicrobial activity.

1 Claim, No Drawings

4-CYANO-3,5-ISOTHIAZOLEDIYLBIS(THIOMETHYLENE)DITHIOCYANATE

BACKGROUND OF THE INVENTION

U.S. Pat. No. 3,155,678, patented Nov. 3, 1964, discloses isothiazoles which have halo in the 3-position, cyano in the 4-position and may have halo, alkylthio or haloalkylthio in the 5-position. U.S. Pat. No. 3,375,161, patented Mar. 26, 1968, discloses that 4-cyano-3,5-dichloroisothiazole is useful as a microbiocide. South African Pat. No. 68 03,355, patented Jan. 29, 1969, discloses 4-cyano-3,5-bis(ethylthio)isothiazole and similar compounds.

SUMMARY OF THE INVENTION

This invention concerns the new compound 4-cyano-3,5-isothiazolediylbis(thiomethylene)dithiocyanate, hereinafter Compound, corresponding to the formula

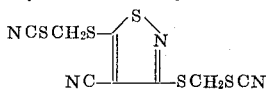

The Compound is a light brown solid which is soluble in methylene chloride, chloroform and acetone and insoluble in water.

The Compound is prepared by mixing at room temperature substantially one molar proportion of a di(alkali metal) salt of 3,5-dimercapto-4-isothiazolecarbonitrile with substantially 2 molar proportions of chloromethylthiocyanate in the presence of a lower alkanol such as methanol or ethanol as reaction medium. The sodium and potassium salts of the first starting material are advantageously used. The reaction is completed when by-product alkali metal chloride no longer forms. The reaction mixture is then filtered and the filtrate is evaporated to leave crude product as a brown oil. The product is purified by chromatography using a silica gel column and chloroform as the eluant. The yellowish-brown oil which is collected is dried under vacuum and solidified to a light brown material melting at 83°–86°C. The Compound has antimicrobial activity, specifically anti-bacterial and antifungal activity.

DESCRIPTION OF THE PREFERRED EMBODIMENTS

The following example and teachings additionally describe specific embodiments and the best mode contemplated by the inventor of carrying out the invention.
Example: Preparation of 4-Cyano-3,5-isothiazolediylbis(thiomethylene)dithiocyanate To a stirred solution of 4.36 g. (0.02 mol) of the disodium salt of 3,5-dimercapto-4-isothiazolecarbonitrile in 100 ml. of methanol add 4.3 g. (0.04 mol) of chloromethylthiocyanate. The reaction mixture is stirred overnight at room temperature and filtered. The filtrate is evaporated, leaving a brown oil as crude product. The crude product is purified by elution with chloroform from a silica gel column. The yellowish-brown oil eluate collected is dried under vacuum and solidifies to a light brown material, melting at 83°–86°C.

Anal. Calcd. for $C_8H_4N_4S_5$: C, 30.38; H, 1.27; N, 17.72; S, 50.63.
Found: C, 30.5; H, 1.53; N, 17.1; S, 50.5.

The Compound of the invention is useful as an antimicrobial for the control of bacteria and fungi. This is not to suggest that the Compound of this invention is equally effective against all such organisms at the same concentration. For such uses the Compound can be employed in an unmodified form or dispersed on a finely divided solid and employed as a dust. Such mixtures can also be dispersed in water with the aid of a surface-active agent and the resulting emulsions employed as sprays. In other procedures, the Compound can be employed as an active constituent in solvent solutions, oil-in-water or water-in-oil emulsions. The augmented compositions are adapted to be formulated as concentrates and subsequently diluted with additional liquid or solid adjuvants to produce the ultimate treating compositions. Good results are obtained when employing compositions containing bactericidal and fungicidal concentrations and usually from about 10 to about 100 parts by weight of the Compound per million parts of such compositions.

Incorporation of the Compound of this invention into materials which are subject to fungal attack inhibits the growth of the fungi and preserves the original value of the materials. The Compound is sufficiently non-volatile and water-insoluble that it will persist on or in such materials for long periods of time. Examples of materials which are adversely affected by fungal growth are latex and alkyd paint films, wood and wooden products. The inventive Compound is sufficiently active against fungi that only small quantities are required to prevent mildew on paint films or wood rot. The Compound is therefore useful for long-term protection against fungal growth in or on materials having a wood basis or a protective or decorative paint film subject to fungal attack.

In representative operations, the product of the Example when tested for antimicrobial activity using conventional agar dilution tests gave complete growth inhibition against the following organisms at the indicated concentrations in parts per million:

Table

| Antimicrobial Activity | |
|---|---|
| S. aureus | 10 |
| C. albicans | 10 |
| E. coli | 100 |
| Pseudomonas Str. 10 | 100 |
| S. typhosa | 100 |
| M. phlei | <1 |
| T. mentagrophytes | <1 |
| B. subtilis | <1 |
| C. pelliculosa | 10 |
| P. pullulans | <1 |
| Ceratocystis ips | 10 |
| Trichoderma Sp. P-42 | 10 |
| R. nigricans | 10 |
| A. niger | <1 |

Equal volumes of each of a 5-day culture of B. subtilis and one day cultures of P. aeruginosa and E. aerogenes were mixed to give an inoculum for adding to a paper pulp substrate consisting of an aqueous 0.5% Kraft hardwood paper pulp slurry at a pH of 5.2 – 5.5.

One ml. of the mixed inoculum was added to 50 ml. of the pulp slurry. The inoculum contained $10^8 - 10^9$ bacteria/ml. Following exposure for one day, the substrate was tested for bacteria by using a sterile, cotton swab technique. Nutrient agar plates were used for streaking. Repeated daily insults were carried out using 0.5 ml. inoculum additions with subsequent streaking. The following table summarizes the results obtained with Compound at the indicated concentrations.

| Concentration μg/ml | Slimicidal Rating, Days' Insults | | | | | | |
|---|---|---|---|---|---|---|---|
| | 1 | 2 | 3 | 4 | 5 | 6 | 7 |
| 50 | 1* | 1 | 8 | 1 | 1 | 2 | 1 |
| 100 | 1 | 1 | 8 | 1 | 1 | 1 | 1 |
| 250 | 1 | 1 | 1 | 1 | 1 | 1 | 1 |

* 1 to 10 rating, with 1 as sterile to 10 contaminated similar to control

The preparation of di(sodiomercapto)methylenemalononitrile (I) by reacting malononitrile (II) with carbon disulfide is disclosed in U.S. Pat. No. 3,694,211, patented Sept. 26, 1972. The disodium salt of 3,5-dimercapto-4-isothiazolecarbonitrile (III) is formed by reacting (I) with sulfur in boiling methanol; J. Org. Chem. 29, 665 (1964).

What is claimed is:

1. 4-Cyano-3,5-isothiazolediylbis(thiomethylene)dithiocyanate.

* * * * *